(12) United States Patent
Sambo et al.

(10) Patent No.: US 9,077,481 B2
(45) Date of Patent: Jul. 7, 2015

(54) METHOD AND APPARATUS FOR DYNAMIC WAVELENGTH ALLOCATION IN WAVELENGTH SWITCHED OPTICAL NETWORKS

(71) Applicant: TELEFONAKTIEBOLAGET L M ERICSSON (publ), Stockholm (SE)

(72) Inventors: Nicola Sambo, Leghorn (IT); Giulio Bottari, Leghorn (IT); Piero Castoldi, Vicopisano (IT); Filippo Cugini, Fidenza (IT); Paola Iovanna, Rome (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 2 days.

(21) Appl. No.: 14/012,304

(22) Filed: Aug. 28, 2013

(65) Prior Publication Data

US 2014/0023372 A1   Jan. 23, 2014

Related U.S. Application Data

(63) Continuation of application No. 13/817,025, filed as application No. PCT/EP2010/062344 on Aug. 24, 2010, now abandoned.

(51) Int. Cl.
*H04J 14/02* (2006.01)
(52) U.S. Cl.
CPC ......... *H04J 14/0257* (2013.01); *H04J 14/0224* (2013.01); *H04J 14/026* (2013.01); *H04J 14/0267* (2013.01); *H04J 14/0271* (2013.01)

(58) Field of Classification Search
CPC .............. H04J 14/0224; H04J 14/0257; H04J 14/0267; H04J 2014/0253
See application file for complete search history.

(56) References Cited

U.S. PATENT DOCUMENTS

| | | | |
|---|---|---|---|
| 2003/0215233 A1 | 11/2003 | Tomofuji et al. | |
| 2004/0205236 A1* | 10/2004 | Atkinson et al. | 709/238 |
| 2004/0252996 A1 | 12/2004 | McNicol | |
| 2009/0304380 A1* | 12/2009 | Sadananda et al. | 398/26 |
| 2009/0317076 A1 | 12/2009 | Shimizu | |
| 2010/0158531 A1 | 6/2010 | Chung et al. | |
| 2011/0044689 A1* | 2/2011 | Vassilieva et al. | 398/65 |

FOREIGN PATENT DOCUMENTS

| | | |
|---|---|---|
| EP | 1 324 523 | 7/2003 |
| WO | WO 2004/109958 | 12/2004 |

OTHER PUBLICATIONS

International Search Report for PCT/EP2010/062344 mailed May 27, 2011.
I. Tomkos et al., "New Challenges in Next-Generation Optical Network Planning", Transparent Optical Networks (ICTON), 2010 12th International Conference on, Jun. 27, 2010, pp. 1-4.

(Continued)

*Primary Examiner* — David Payne
*Assistant Examiner* — Casey Kretzer
(74) *Attorney, Agent, or Firm* — Baker Botts, LLP

(57) ABSTRACT

A method of allocating a wavelength to a lightpath in a wavelength multiplex for use in an optical network comprising nodes connected by optical links, wherein the wavelength multiplex is adapted to support lightpaths of two different bitrates. The disclosed method allows for efficient allocation of wavelengths that prevents wasting bandwidth and mitigates detrimental effects of cross-phase modulation.

14 Claims, 4 Drawing Sheets

(56) References Cited

OTHER PUBLICATIONS

K. Ho, "Error Probability of DPSK Signals with Cross-Phase Modulation Induced Nonlinear Phase Noise", IEEE Journal of Selected Topics in Quantum Electronics, vol. 10, No. 2, Mar./Apr. 2004, pp. 421-427.

H. Griesser et al., "Influence of Cross-Phase Modulation Induced Nonlinear Phase Noise on DQPSK Signals from Neighbouring OOK Channels", ECOC 2005 Proceedings—vol. 2, Paper Tu 1.2.2, pp. 123-124.

* cited by examiner

METHOD AND APPARATUS FOR DYNAMIC WAVELENGTH ALLOCATION IN WAVELENGTH SWITCHED OPTICAL NETWORKS

This application is a continuation of U.S. patent application Ser. No. 13/817,025 filed Feb. 14, 2013, which is the U.S. national phase of International Application No. PCT/EP2010/062344 filed 24 Aug. 2010 which designated the U.S., the entire contents of which is hereby incorporated by reference.

TECHNICAL FIELD

The present invention relates to optical telecommunications and data networks, in general, and in particular to a method and apparatus for dynamic wavelength allocation in wavelength switched optical networks.

BACKGROUND

Emerging solutions for Wavelength Switched Optical Networks (WSONs) will simultaneously allow mesh connectivity of multiple bitrate channels over the same optical transmission infrastructure. In this way it will be possible to provide a flexible transport platform for current and future bitrates. It means that when upgrading existing telecommunications and data networks to operate as WSON a provision of 40 Gbit/s (or even at higher bitrate) optical signals in conjunction with existing 10 Gbit/s signals will be necessary.

In a multi bitrate WSON scenario, Cross-Phase Modulation (XPM) is particularly detrimental on Phase-Shift Keying (xPSK) modulated signals when induced by On Off Keying (OOK) modulated signals. As an example, a 10 Gbit/s lightpath, which is OOK modulated, may induce a very detrimental XPM on a 40 Gbit/s lightpath, which is typically Differential Quadrature Phase-Shift Keying (DQPSK) modulated. Indeed, the changes on the fibre refractive index due to the intensity modulation of an OOK cause perturbation of the xPSK signal phase. In turn, the effects of a 40 Gbit/s lightpath on a 10 Gbit/s lightpath are not so detrimental, as well as between lightpaths at the same bitrate.

In known solutions, XPM is considered as a penalty (e.g., on Optical Signal to Noise Ratio—OSNR), computed in the worst-case scenario. In the case of multi bitrate WSON, the worst-case scenario consists of a xPSK modulated lightpath, which is positioned at the centre of the Dense Wavelength Division Multiplex (DWDM) comb of OOK modulated wavelengths. In this way, if the Quality of Transmission (QoT) of the xPSK modulated lightpath is acceptable, accounting for the worst-case penalty, the QoT is acceptable with any other arrangement of lightpaths within the DWDM comb.

The biggest disadvantage of the known method is that the QoT evaluation accounting for worst-case penalty is pessimistic in the way that some wavelengths are classified as unacceptable for lightpath assignment even though in real life network there would be no problem with operating lightpaths on them. Indeed, a set of paths is considered unacceptable in terms of QoT (i.e. the resulting Bit Error Rate—BER—is considered unacceptable) even if the worst-case scenario is not present. Upon lightpath request, the Path Computation Element (PCE), which computes the path to provision the lightpath, has to exclude some actually acceptable paths, resulting in inefficient resource utilization.

SUMMARY

It is the object of the present invention to obviate at least some of the above disadvantages and provide an improved method of wavelength allocation and a network management system for implementing this method.

Contrary to known solutions, which typically assume optical signals with homogenous bitrate and modulation format, we propose a new dynamic wavelength allocation strategy that takes into account and mitigates the different inter bitrate crosstalk in the connection provisioning process.

According to a first aspect of the present invention there is provided a method of allocating a wavelength to a lightpath in a wavelength multiplex. The method is for use in an optical network comprising nodes connected by optical links. The wavelength multiplex is adapted to support lightpaths of two different bitrates and the lightpaths operate on different wavelengths. The method is performed at a Network Management System (NMS) and comprises receiving a request for a new lightpath in response to which the new lightpath is computed. Once the new lightpath is computed, QoT of the new lightpath is evaluated and then compared with a threshold. If the QoT is at or above the threshold the method comprises execution of one of two sets of steps depending on whether the new lightpath is to operate at the higher or the lower of the two bitrates.

If the new lightpath is to operate at the lower of the two bitrates the method comprises determining an existing lightpath, which operates at the higher of the two bitrates and which has a shortest wavelength among the lightpaths operating at the higher bitrate in the wavelength multiplex. In the next step the method comprises allocating to the new lightpath a wavelength from the wavelength multiplex shorter than said shortest wavelength and separated from said shortest wavelength by at least a defined number of unused wavelengths of the multiplex.

If the new lightpath is to operate at the higher of the two bitrates the method comprises determining an existing lightpath operating at the lower of the two bitrates and having a longest wavelength among the lightpaths operating at the lower bitrate in the wavelength multiplex. In the next step the method comprises allocating to the new lightpath a wavelength from the wavelength multiplex longer than said longest wavelength and separated from said longest wavelength by at least the defined number of unused wavelengths of the multiplex.

According to a second aspect of the present invention there is provided a network management system arrangement operating in an optical network comprising nodes connected by optical links. The nodes and links support wavelength multiplex, wherein lightpaths in the multiplex operate at different wavelengths at two different bitrates. The arrangement comprises an interface for connecting to the optical network, a Path Computation Engine (PCE), a QoT module and a processor. The PCE is adapted to receive a request for a new lightpath and to forward this request to the PCE. The PCE is adapted to compute the new lightpath, whereas the QoT module is adapted to evaluate QoT value of the new lightpath. The QoT module is adapted to compare the evaluated QoT with a threshold. If the QoT obtained by the QoT module is at or above the threshold the processor is adapted to operate according to one of two sets of steps depending on whether the new lightpath is to operate at the lower or the higher of the two bitrates.

If the new lightpath is to operate at the lower of the two bitrates the processor is adapted to determine an existing lightpath operating at the higher of the two bitrates and having a shortest wavelength among the lightpaths operating at the higher bitrate in the wavelength multiplex. Once this is done the processor is adapted to allocate to the new lightpath a wavelength from the wavelength multiplex shorter than said shortest wavelength and separated from said shortest wavelength by at least a defined number of unused wavelengths of the multiplex.

If the new lightpath is to operate at the higher of the two bitrates the processor is adapted to determine an existing lightpath operating at the lower of the two bitrates and having a longest wavelength among the lightpaths operating at the lower bitrate in the wavelength multiplex. Once this is done the processor is adapted to allocate to the new lightpath a wavelength from the wavelength multiplex longer than said longest wavelength and separated from said longest wavelength by at least the defined number of unused wavelengths of the multiplex.

Further features of the present invention are as claimed in the dependent claims.

BRIEF DESCRIPTION OF THE DRAWINGS

The present invention will be understood and appreciated more fully from the following detailed description taken in conjunction with the drawings in which.

DETAILED DESCRIPTION

To illustrate embodiments of the present invention a transparent optical network with N nodes and L bi-directional links is considered. It is also assumed that the network is a Dense Wavelength Division Multiplexed (DWDM) network. The invention, however, is equally applicable to WDM (Wavelength Division Multiplexed) networks. In such DWDM network adjacent wavelength channels are spectrally separated by a constant quantity (e.g. 100 GHz). Wavelength carriers are ordered in an ascending way. Assuming that $w_0$ is the lowest wavelength channel (operating at wavelength $\lambda_0$) in the DWDM comb (or multiplex), $w_1$ (operating at wavelength 2) is the channel nearest to $w_0$. Typically, in DWDM multiplex there are 40 wavelengths (channels) with indexes running from 0 to 39. Each node and link support transmission and reception at 10 Gbit/s and 40 Gbit/s, and each link supports W wavelengths per direction (W=40 in this example). In alternative embodiments there is 80 or even 160 channels in the wavelength multiplex. In various alternative embodiments the link supports transmission and reception at other bitrates, e.g. 10 Gbit/s and 100 Gbit/s.

The present invention uses a guard band (GB), which is defined as the number of free wavelengths between a 40 Gbit/s lightpath and the nearest 10 Gbit/s lightpath, for which XPM is negligible or, more general, between two neighbour lightpaths of different bitrates for which XPM is negligible.

Figure 1:
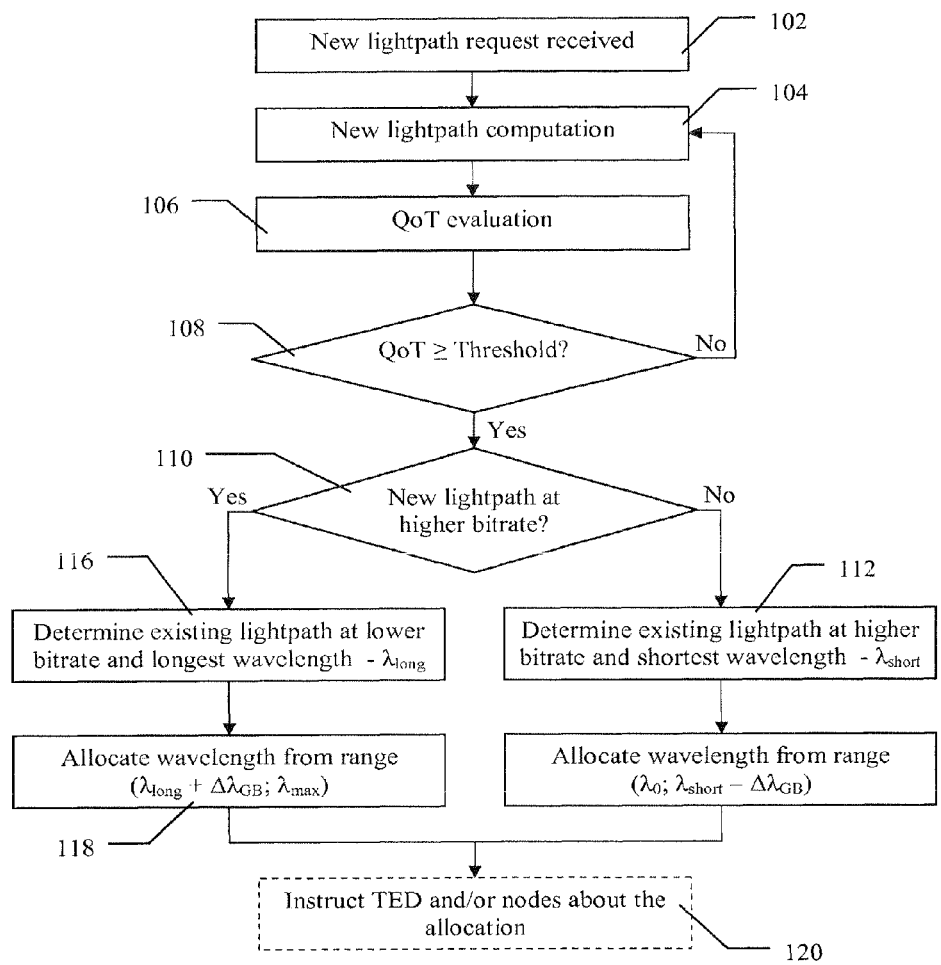
FIG. 1 is a diagram illustrating a method of allocating a wavelength in one embodiment of the present invention.
Figure 2:
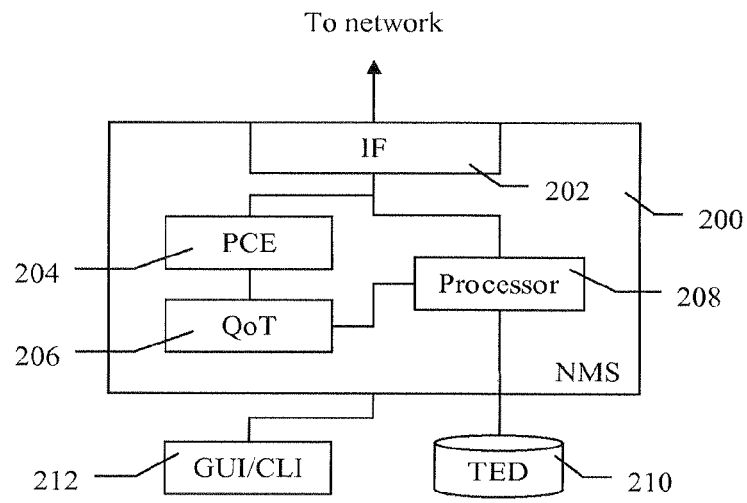
FIGS. 2 to 4 are diagrams illustrating a network management system arrangement in various embodiments of the present invention.

With reference to FIG. 1 a method of allocating a wavelength to a lightpath in a wavelength multiplex is presented. In short, the invention allows dynamically establish lightpaths at the same bitrate along neighbouring wavelengths and to separate lightpaths at different bitrates by a GB to mitigate for cross phase modulation effects. In a basic embodiment the method is implemented for wavelength allocation to a lightpath between two nodes over a single optical fibre link connecting said two nodes. When a new lightpath for establishing a connection between a source-destination pair is requested (two nodes connected by an optical fibre link in this embodiment) a path computation engine of a NMS that manages operation of the network receives a request 102 for setting up the new lightpath. The new lightpath request is submitted via a command line interface (CLI) or a graphical user interface (GUI) 212. Alternatively, or in an addition to the above ways of receiving the new lightpath request, if the new lightpath is for failure recovery purposes, the request can be automatically produced by the NMS to find an on the fly recovery lightpath. The NMS 200 as illustrated in FIG. 2 is connected to the network it manages via an interface 202. In response to the request a Path Computation Engine (PCE) 204 computes 104 the new lightpath. Preferably, in the process of computing the lightpath the PCE 204 takes account for administrative costs. The PCE 204 operates using a routing algorithm and such algorithm has, as its objective function, minimization of the total cost of the computed path (each link of the mesh has its cost or weight). As a link cost, typically is used the administrative cost that is the economic cost to use the link. The operator defines the administrative cost of each link and sets these costs manually in the NMS 200 before the PCE operation. The concept of cost of a link is well known in the art and will not be discussed here. Once the new lightpath is computed 104 a module 206 responsible for monitoring quality of transmission (QoT) evaluates 106 the quality of transmission of the new lightpath. Preferably, the QoT evaluation ignores cross phase modulation (XPM) effects. The quality of transmission of a lightpath is defined with reference to bit error rate (BER). BER, in turn, is related to the optical signal to noise ratio (OSNR). In particular, the lower the OSNR, the higher the BER.

A QoT module (element 206 in FIG. 2) is in charge of physical validation of optical paths. The module evaluates the overall OSNR of the optical links considering the signal power levels, span losses and characteristics of interfaces and amplifiers. A set of penalties is detracted from the OSNR resulting in a net OSNR. Each optical interface (i.e. transponder) has its own specific receiver model. According to the relevant model the signal quality parameter Q is computed starting from the net OSNR. An additional set of penalties is detracted from the Q factor resulting in a net Q.

In general, propagation effects that do not affect the received OSNR but impact the quality of the received eye-diagram, and so the bit error rate (BER), are assigned to the Q factor.

The net Q is finally increased by adding the FEC gain and compared with a threshold. The $Q_{THR}$ threshold is defined as the Q required to meet a post forward error correction BER of $10^{-15}$. The expected threshold, $Q_{THR}$, is subtracted from the net Q to obtain the Quality of Transmission (QoT) parameter:

$$QoT = Q(OSNR - OSNR_{PEN}) - Q_{PEN} + FEC_{GAIN} - Q_{THR}$$

The QoT parameter is used instead of using directly the BER because it's simpler to address some penalties to the Q rather than referring them to the BER.

Following the evaluation step the method includes comparing 108 the evaluated QoT of the new lightpath with a threshold defining acceptable quality level. In other words, it is checked if the lightpath computed by the PCE meets the quality requirements specified for lightpaths in the network. If the evaluated QoT is below the threshold the quality is not adequate and the lightpath is discarded, and a new one is computed.

If the evaluated QoT is acceptable two different strategies are used depending on whether the new lightpath is to operate at the higher or the lower of the two bitrates.

If the new lightpath is to operate at 10 Gbit/s the processor 208 examines existing lightpaths in the wavelength multiplex in order to find, 112, a lightpath operating at 40 Gbit/s and using a shortest wavelength among the lightpaths operating at 40 Gbit/s bitrate in the wavelength multiplex. The determined shortest wavelength is denoted as $\lambda_{short}$.

In embodiments of the present invention the network has a centralized architecture where the NMS is the only entity which can activate or tear down the lightpaths. In consequence the NMS has the full view of the already established lightpaths and their status and can determine the lightpath operating at 40 Gbit/s and using a shortest wavelength among the lightpaths operating at 40 Gbit/s bitrate in the wavelength multiplex as required in 112.

Once the $\lambda_{short}$ is found the processor allocates 114 to the new lightpath a selectable wavelength (i.e. unused wavelength) that is shorter than the $\lambda_{short}$ and separated from the $\lambda_{short}$ by a guard band. The guard band is a part of a spectrum not to be used for transmission and which is broad enough that the cross phase modulation effects of the two neighbouring lightpaths of different bitrates are negligible. The guard band can be expressed in number of channels (that must be left unassigned) and is denoted as GB. Alternatively, when a wavelength notation is used, the guard band directly refers to a physical part of the spectrum that must not be assigned to any lightpath and is denoted as $\Delta\lambda_{GB}$ (expressed in nm).

The new lightpath can have assigned a selectable wavelength from the range $(\lambda_0; \lambda_{short}-\Delta\lambda_{GB})$, where $\lambda_0$ is the shortest wavelength in the multiplex. Because in a DWDM network there is a discrete number of channels associated with their wavelengths and spectrally separated by a constant band of the optical spectrum (e.g. 40 channels spaced by 100 GHz) it is sometimes easier to refer to channels by their indexes rather than wavelengths. In this situation the guard band is simply a part of the spectrum of the DWDM multiplex comprising a defined number of channels as explained above.

When channel indexes rather than wavelengths are considered the processor 208 searches, 112, for a lightpath operating at 40 Gbit/s and having a wavelength with a lowest index ($w_{low}$) among the lightpaths operating at 40 Gbit/s bitrate in the wavelength multiplex. The range of channels available for assignment to the new lightpath will be defined as ($w_0$; $w_{low}$-GB), where $w_0$ is a channel with the shortest wavelength (i.e. $\lambda_0$) in the multiplex. In practice it means that if, for example, GB=2 then two channels adjacent to channel $w_{low}$ on the left side of $w_{low}$ (shorter wavelengths, i.e. lower indexes) are excluded from being assigned to a lightpath.

If the new lightpath is to operate at 40 Gbit/s the processor 208 examines existing lightpaths in the wavelength multiplex in order to find, 116, a lightpath operating at 10 Gbit/s and using a longest wavelength among the lightpaths operating at 10 Gbit/s bitrate in the wavelength multiplex. The determined longest wavelength is denoted as $\lambda_{long}$. The determination of the lightpath operating at 10 Gbit/s and using the longest wavelength is done in the same way as in step 112 described above.

Once the $\lambda_{long}$ is found the processor allocates 118 to the new lightpath a selectable wavelength that is longer than the $\lambda_{long}$ and separated from the $\lambda_{long}$ by the guard band $\Delta\lambda_{GB}$. In other words, the new lightpath can have assigned a selectable wavelength from the range ($\lambda_{long}+\Delta\lambda_{GB}$; $\lambda_{max}$), where $\lambda_{max}$ is the longest wavelength in the multiplex. For a DWDM system with 40 channels $\lambda_{max}$ will be $\lambda_{39}$, for system with 80 channels $\lambda_{79}$, etc.

Again, the range of channels available for allocation to the new 40 Gbit/s lightpath, when written in terms of channels and their indexes, can be defined as ($w_{high}$+GB; $w_{max}$), where $wm_{high}$ denotes the channel corresponding to $\lambda_{long}$ and $w_{max}$ denotes the channel corresponding to $\lambda_{max}$, where max will be 39, 79 or 159 depending on the DWDM system.

The situation that the requested lightpath goes along only one link connecting two nodes is only one possible situation. Often the lightpath traverses many nodes and links. In a preferred embodiment, if the lightpath connecting a source and a destination consists of a plurality of links and nodes of the optical network, the method described in the above embodiment is performed by the network management system independently for each of the links.

Also preferably, the network management system instructs, 120, the ingress node originating the new lightpath, about the computed path (series of hops from ingress to egress nodes) and the relevant wavelength allocation. The signalling protocol, activated by the ingress node, communicates on a hop-by-hop basis, the required cross connection to the required network nodes for lightpath setup.

In a preferred embodiment the network management system 200 accesses a database 210 comprising information about wavelengths allocated to existing lightpaths and in this way determines the $\lambda_{long}$ and $\lambda_{short}$ wavelengths. Preferably, the database is a Traffic Engineering Database (TED). Once the wavelength is assigned to the new lightpath the network management system 200 sends an update, 120, to the database 210 with information about the wavelength allocated to the new lightpath.

The present invention in its embodiments is especially applicable when two different types of modulation are associated with the two bitrates of the lightpaths and in the most likely scenario the 10 Gbit/s lightpath is OOK modulated and the 40 Gbit/s lightpath is DQPSK modulated. However, other combinations of bitrates and modulations are also possible.

Figure 3:
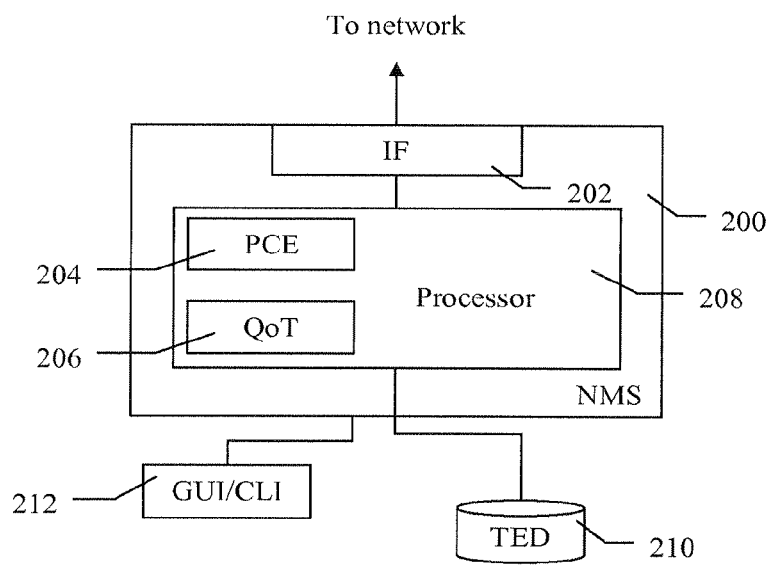
Figure 4:
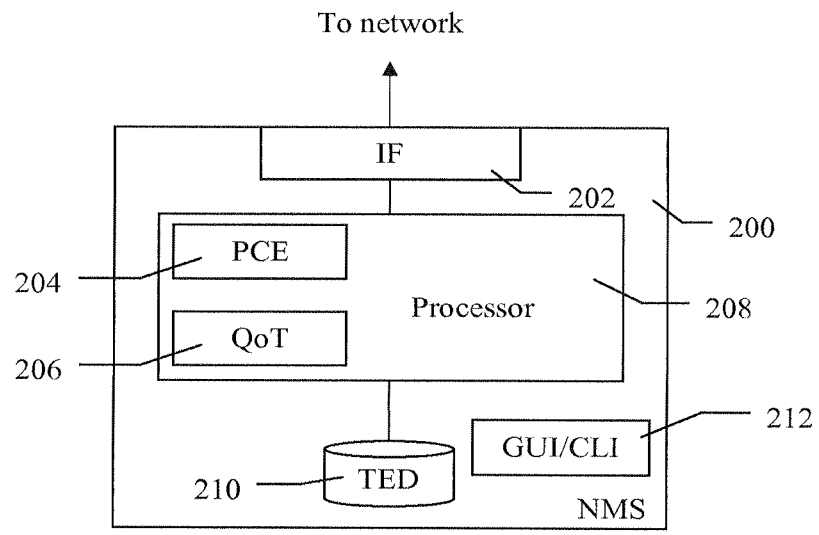
Figure 5:
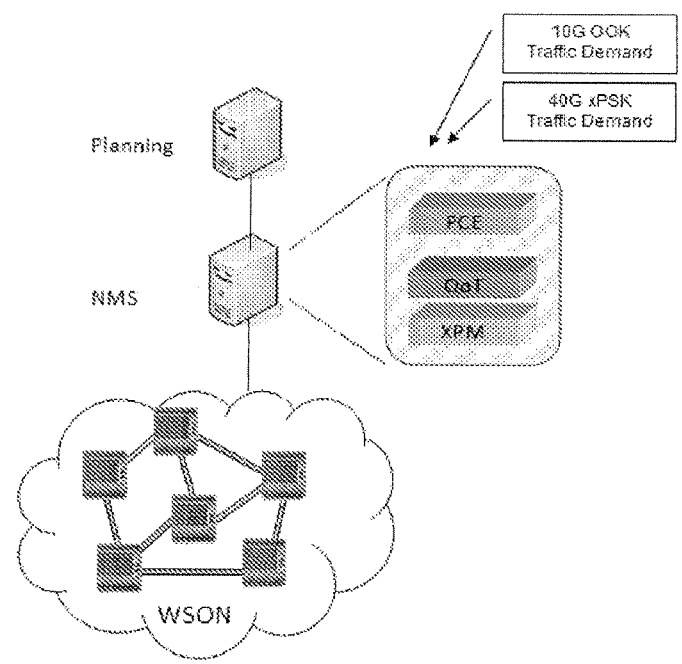
FIG. 5 illustrates an optical network with implemented network management system in accordance with one embodiment of the present invention.

FIGS. 2-4 illustrate three embodiments of arrangement of the network management system 200 implementing the embodiments of the method of the present invention. The network management system comprises an interface 202 for connecting to the optical network 500 (as illustrated in FIG. 5), a path computation engine 204 that computes the lightpath in response to a request and a QoT module 206 that evaluates the QoT of the lightpath calculated by the PCE 204. The NMS 200 also comprises a processor 208 that determines the $\lambda_{long}$ and $\lambda_{short}$ wavelengths (or their corresponding channels and indexes) and assigns a wavelength from one of the ranges ($\lambda_0$; $\lambda_{short}-\Delta\lambda_{GB}$) or ($\lambda_{long}+\Delta\lambda_{GB}$; $\lambda_{max}$) to the new lightpath. In various embodiments the PCE 204, QoT module 206 and processor 208 can be implemented in different ways.

In the embodiment illustrated in FIG. 2 the PCE 204, QoT module 206 and processor 208 are all separate, discrete modules.

In the embodiment illustrated in FIG. 3 and FIG. 4 the PCE 204 and QoT module 206 are presented as parts of the processor 208. At present, processing capacity of a processor is large enough to allow for configuring/programming the processor 208 in a way that it can run an application or applications performing the functions of the PCE 204 and the QoT module 206 in addition to other functions and tasks of the processor 208.

The network management system has also access to a database 210 containing information about wavelength assignments in the optical network managed by the NMS 200. In one embodiment the database 210 is a traffic engineering database (TED).

In one embodiment the database 210 is part of the network management system 200 as illustrated in FIG. 4. Alternatively, as illustrated in FIG. 2 and FIG. 3 the database 210 is separate from the NMS 200. It is clear that the NMS 200 as illustrated in FIG. 2 may comprise the database 210 as one of its modules, similarly to the solution illustrated in FIG. 4.

A graphical user interface (GUI) or a command line interface (CLI) 212 is connected to the NMS 200. In alternative embodiments the GUI or CLI is part of the NMS 200.

Figure 6:
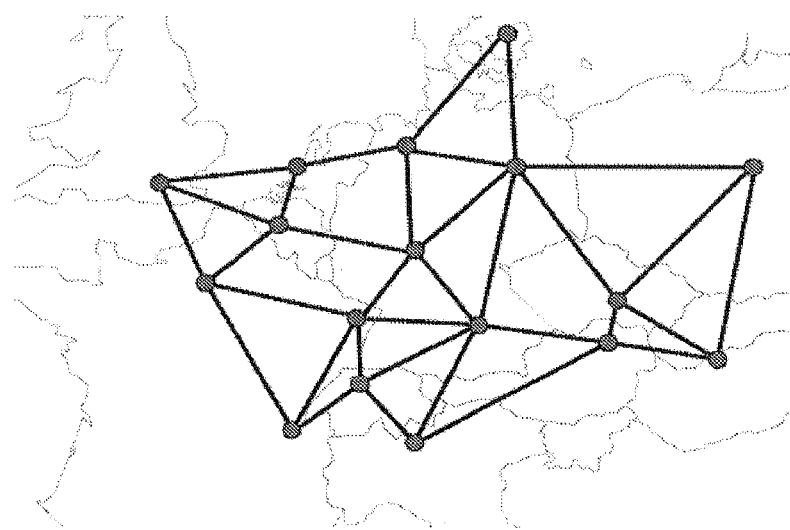
FIG. 6 illustrates a large-scale optical network.

The present invention allows for considering a large set of candidate paths which are acceptable in terms of QoT when a multi-bitrate wavelength switched optical network (WSON) is considered. The present invention is easy to implement and does not require any additional protocol extension. The main advantage of the present invention is better utilisation of available resources compared with known solutions. To illustrate the advantage of the present invention a large Pan-European network as illustrated in FIG. 6 is considered. The network comprises 17 nodes (N=17), 33 links (L=33), there are 40 wavelengths, or channels in the multiplex (W=40), network diameter is 4 (D=4) and channel spacing is 100 GHz. The diameter of a network (D) is the greatest distance between any pair of network nodes. To find the diameter of a network it is necessary to find first the shortest path between each pair of nodes. The greatest length of any of these shortest paths is the diameter of the graph. So when a path long D+1 is considered, such path is not the shortest. The concept of a diameter of a network (or graph) is well known and does not require further explanation. QoT information includes optical signal to noise ratio, chromatic dispersion, polarization mode dispersion, and self phase modulation. Considering all source-destination pairs in this example, the number of selectable lightpaths is 2226.

Figure 7:
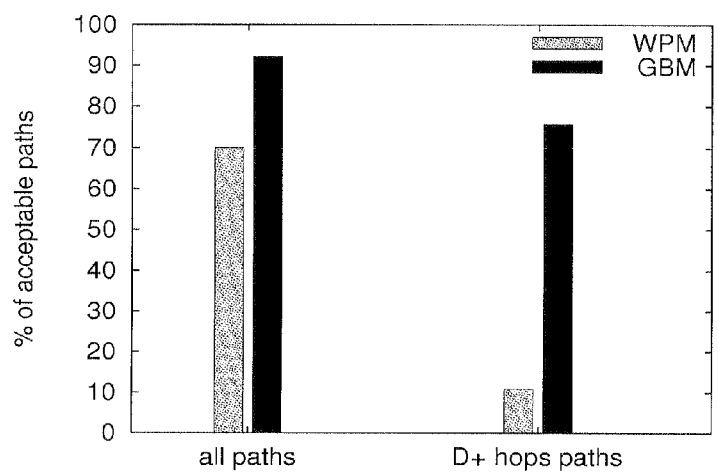
FIG. 7 shows comparison of results obtained using the method in one embodiment of the present invention with a prior art solution.

FIG. 7 assumes that there are 10 Gbit/s lightpaths in the network and compares a percentage of paths that are acceptable, in terms of QoT, for 40 Gbit/s lightpaths. Guard Band method of the present invention denoted in FIG. 7 as GBM is compared with the known method accounting for worst-case penalty, here called worst-case penalty method (WPM). Two situations are analysed, and when all 2226 lightpaths are considered about 70% of lightpaths are acceptable according to the known method and 92% are acceptable according to the method of the present invention. When only long paths are considered (D+1 hop) the supremacy of the present invention over the prior art is even bigger. GBM finds 75% of the lightpaths to be acceptable, whereas the prior art method only 10%.

The invention claimed is:

1. A method of allocating a wavelength to a lightpath in a wavelength multiplex for use in an optical network comprising nodes connected by optical links, wherein the wavelength multiplex is adapted to support lightpaths of two different bitrates, the lightpaths operating on different wavelengths; the method comprising, at a network management system:
   receiving a request for a new lightpath;
   computing the new lightpath in response to the request;
   evaluating quality of transmission, QoT, of the new lightpath;
   comparing the evaluated QoT of the new lightpath with a threshold and if the QoT is at or above the threshold the method comprises:
   determining an existing lightpath operating at the higher of the two bitrates and having a shortest wavelength among the lightpaths operating at the higher bitrate in the wavelength multiplex if the new lightpath is to operate at the lower of the two bitrates; and
   allocating to the new lightpath a wavelength from the wavelength multiplex shorter than said shortest wavelength and separated from said shortest wavelength by at least a defined number of unused wavelengths of the multiplex; or
   determining an existing lightpath operating at the lower of the two bitrates and having a longest wavelength among the lightpaths operating at the lower bitrate in the wavelength multiplex if the new lightpath is to operate at the higher of the two bitrates; and
   allocating to the new lightpath a wavelength from the wavelength multiplex longer than said longest wavelength and separated from said longest wavelength by at least the defined number of unused wavelengths of the multiplex.

2. The method according to claim 1, wherein if the lightpath connecting a source and a destination consists of a plurality of links between nodes of the optical network the method of claim 1 is performed for each of the links.

3. The method according to claim 1, comprising instructing the nodes traversed by the new lightpath about the wavelength allocation.

4. The method according to claim 1, wherein the step of computing the new lightpath accounts for administrative costs.

5. The method according to claim 1, wherein in the step of evaluating QoT of the new lightpath cross phase modulation is ignored.

6. The method according to claim 1, wherein the threshold defines an acceptable level of a quality of transmission.

7. The method according to claim 1, wherein in the steps of determining the network management system accesses a database comprising information about wavelengths allocated to existing lightpaths.

8. The method according to claim 7, further comprising updating the database with information about the wavelength allocated to the new lightpath.

9. A network management system arrangement operating in an optical network comprising nodes connected by optical links, the nodes and links supporting wavelength multiplex, wherein lightpaths in the multiplex operate at different wavelengths at two different bitrates, the arrangement comprising an interface for connecting to the optical network, a path computation engine, a quality of transmission module and a processor wherein the path computation engine is adapted to receive a request for a new lightpath and to compute said new lightpath whereas the quality of transmission module is adapted to evaluate quality of transmission, QoT, of the new lightpath and to compare the evaluated QoT with a threshold; if the QoT is above the threshold the processor is adapted to:
   determine an existing lightpath operating at the higher of the two bitrates and having a shortest wavelength among the lightpaths operating at the higher bitrate in the wavelength multiplex if the new lightpath is to operate at the lower of the two bitrates;
   allocate to the new lightpath a wavelength from the wavelength multiplex shorter than said shortest wavelength and separated from said shortest wavelength by at least a defined number of unused wavelengths of the multiplex; or
   determine an existing lightpath operating at the lower of the two bitrates and having a longest wavelength among the lightpaths operating at the lower bitrate in the wavelength multiplex if the new lightpath is to operate at the higher of the two bitrates; and
   allocate to the new lightpath a wavelength from the wavelength multiplex longer than said longest wavelength and separated from said longest wavelength by at least the defined number of unused wavelengths of the multiplex.

10. The arrangement according to claim 9 comprising a database.

11. The arrangement according to claim 9, wherein the processor is adapted to send a message via the interface to instruct the nodes traversed by the new lightpath about the wavelength allocation.

12. The arrangement according to claim 9, adapted to obtain information from and send information to a database.

13. The arrangement according to claim 12, wherein the processor is adapted to access from the database information about wavelength allocated to existing lightpaths.

14. The arrangement according to claim 12, wherein the processor is adapted to update the database with information about the wavelength allocated to the new lightpath.

* * * * *

UNITED STATES PATENT AND TRADEMARK OFFICE
CERTIFICATE OF CORRECTION

Page 1 of 1

PATENT NO. : 9,077,481 B2
APPLICATION NO. : 14/012304
DATED : July 7, 2015
INVENTOR(S) : Sambo et al.

It is certified that error appears in the above-identified patent and that said Letters Patent is hereby corrected as shown below:

Specification

In Column 3, Lines 47-48, delete "wavelength 2)" and insert -- wavelength $\lambda_1$) --, therefor.

In Column 6, Line 4, delete "wm$_{high}$" and insert -- w$_{high}$ --, therefor.

Signed and Sealed this
Twenty-fourth Day of November, 2015

Michelle K. Lee
*Director of the United States Patent and Trademark Office*